W. H. VIBBER.
COMBINED BUSHING AND COUPLING FOR ELECTRIC INSTALLATION.
APPLICATION FILED JAN. 30, 1908.

899,638.  Patented Sept. 29, 1908.

UNITED STATES PATENT OFFICE.

WHEELER H. VIBBER, OF NEW LONDON, CONNECTICUT, ASSIGNOR TO THE GILLETTE-VIBBER CO., OF NEW LONDON, CONNECTICUT, A CORPORATION.

COMBINED BUSHING AND COUPLING FOR ELECTRIC INSTALLATION.

No. 899,638.      Specification of Letters Patent.      Patented Sept. 29, 1908.

Application filed January 30, 1908. Serial No. 413,367.

*To all whom it may concern:*

Be it known that I, WHEELER H. VIBBER, a citizen of the United States, residing at New London, in the county of New London and State of Connecticut, have invented a new and useful Improvement in a Combined Bushing and Coupling for Electric Installation; and I do hereby declare the following, when taken in connection with the accompanying drawings and the letters of reference marked thereon, to be a full, clear, and exact description of the same, and which said drawings constitute part of this specification, and represent, in—

Figure 1:
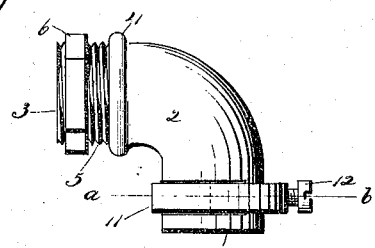
Figure 2:
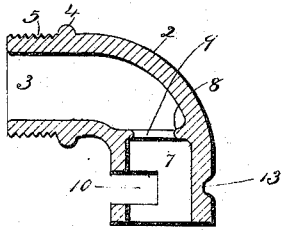
Figure 3:
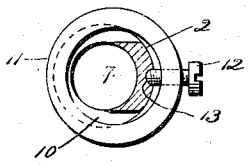

Figure 1 a view in side elevation of a combined bushing and conduit constructed in accordance with my invention. Fig. 2 a view thereof in section with the nut and binding ring removed. Fig. 3 a view in transverse section on the line *a—b* of Fig. 1.

My invention relates to an improved combined outlet bushing and coupling for use in electric installation, the object being to provide for the purpose described, a simple, convenient, compact and effective part constructed with particular reference to avoiding bending the armor of armored cable, and flexible steel conduit.

With these ends in view my invention consists in the construction and combination of parts to be hereinafter described and pointed out in the claims.

In carrying out my invention as herein shown, I employ an elbow-shaped combined bushing and conduit 2 formed at what I may call its bushing-end 3, with an annular bead or shoulder 4, and with external threads 5 for the reception of a binding nut 6. It will be understood that this bushing-end is inserted into the outlet box or cabinet in which it is secured by the nut 6 which is applied and screwed up against the inner face of the box or cabinet until the bead 4 is brought to bear upon the outer face thereof. The conduit-end 7 of my improved part is formed well within its end with an annular stop-shoulder 8 which forms a contracted opening 9 for the wires which are thus centered, so to speak, in the part. The conduit-end 7 of the part is also formed with a transverse slot 10 for the reception of a binding ring 11 carrying a screw 12 the inner end of which enters a notch 13 formed in the outside of the conduit-end 7 at a point opposite the transverse slot 10.

When an armored cable or a flexible conduit is inserted into the conduit-end 7, it will be stopped in its inward movement therein by the shoulder 8 which may be said to position the cable or conduit, after which the screw 12 is operated to draw the ring 11 into the slot 10 whereby the ring in this eccentric movement is caused to grip the cable or conduit and hold the same very firmly in place. On account of the elbow-like form of the part, whereby its bushing-end 3 and conduit-end 7 stand at substantially a right angle to each other, it becomes unnecessary to bend the end of armored cable or flexible conduit being installed, it being extremely desirable to avoid such bending, not only on account of the difficulty of it, but because in making such a bend in a flexible conduit the same is liable to be so distorted as to prevent a wire from being drawn through it. It is not necessary that the bushing and conduit ends 3 and 7 should stand at a right angle to each other as herein shown, as they may be made to stand at any angle to each other required by the circumstances of use.

I claim:—

As a new article of manufacture, a combined bushing and conduit for use in electric installation, consisting in the combination with an elbow having a bushing-end formed with an external shoulder and external threads and provided with a nut and thus adapted to be applied to an outlet box or cabinet, and having its conduit-end formed with a transverse slot, of a clamping ring adapted to be applied over the conduit-end of the said elbow and entering the said slot and furnished with a clamping screw.

In testimony whereof, I have signed this specification in the presence of two subscribing witnesses.

WHEELER H. VIBBER.

Witnesses:
    FREDERIC C. EARLE,
    CLARA L. WEED.